Figure 1:
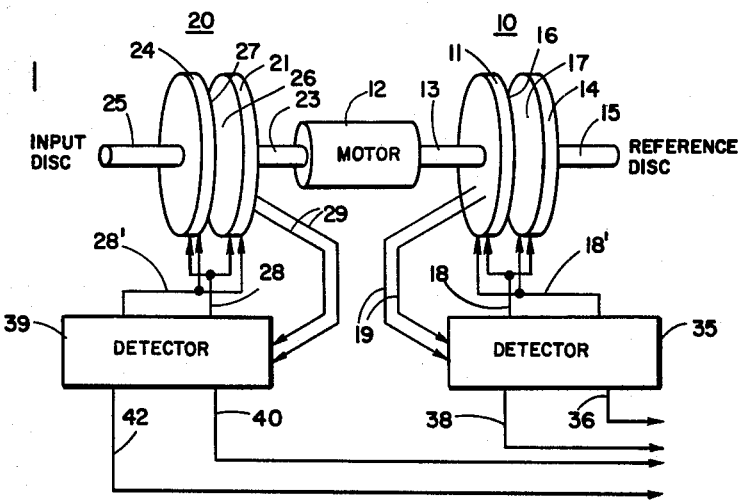

April 13, 1965 W. F. ACKER ETAL 3,178,562
CONTROL APPARATUS
Filed June 8, 1962 3 Sheets-Sheet 1

INVENTOR.
WILLIAM F. ACKER
LEO SPIEGEL
BY
Roger W. Jensen
ATTORNEY.

April 13, 1965    W. F. ACKER ETAL    3,178,562
CONTROL APPARATUS

Filed June 8, 1962    3 Sheets-Sheet 3

INVENTOR.
WILLIAM F. ACKER
LEO SPIEGEL
BY Roger W. Jensen
ATTORNEY.

United States Patent Office 3,178,562
Patented Apr. 13, 1965

3,178,562
CONTROL APPARATUS
William F. Acker, St. Petersburg, and Leo Spiegel, Clearwater, Fla., assignors to Honeywell Inc., a corporation of Delaware
Filed June 8, 1962, Ser. No. 201,055
14 Claims. (Cl. 235—92)

This invention pertains to a digital angle pickoff and more particularly to a pickoff which produces a digital output indicative of the rotational angle between two members.

Angle pickoffs are utilized to determine the angle of relative rotation between two members such as a pair of shafts or two gimbals on an inertial platform. In many cases it is desirable to obtain a digital output from the angle pickoff so that it may be applied directly to a digital computer. One prior art angle pickoff consists of a rotatably mounted disk having equally spaced teeth about its outer periphery similar to a gear, and a cylinder having teeth equal in size to those of the disk but one more in number cut into its inner diameter. The cylinder is then rotatably mounted to one member, the rotation of which it is desired to measure, and the disk is rotatably mounted within the cylinder and driven by the other member, the rotation of which it is desired to measure. Means are utilized to produce pulses as the teeth of the cylinder and the disk align and misalign radially at a zero point and further means, known as vernier means, are utilized to determine a fraction of a pulse by determining the position in relation to the zero point of the next pair of teeth which align radially.

A device similar to the toothed device described above has been designed utilizing a pair of parallel disks rotatably mounted in juxtaposition. The adjacent face of each of the disks has situated thereon conducting material in radial lines. One of the disks has one more radial line than the other to produce the vernier effect described above. The main difficulty in each of the above described systems is the fact that either a pair of teeth or a pair of magnetic lines must be radially or axially aligned to produce a pulse. This, of course, means that the accuracy of the system depends upon the accuracy with which the lines or teeth are produced. It can easily be seen that the upper limit of the amount of teeth or lines produced in these devices will quickly be reached since much interaction will prevail if the lines or teeth are too close together or not precisely constructed.

In the present device two pairs of parallel disk faces rotatably mounted in juxtaposition are utilized. These two pairs of disk faces might be four separate parallel rotatably mounted disks, or could possibly be three rotatably mounted disks as will be explained later. Cooperating means which may be a plurality of segments or bits of conducting material are situated in equally spaced positions about a circle concentric with the axis of rotation on each adjacent face. Also placed at some point on each adjacent face is a zero point indicator which in this preferred embodiment is a conducting slug or larger segment. It should be noted that the zero point indicator does not indicate a zero alignment point on the disks but simply produces a pulse which activates certain gates in the logic circuits to be explained later. This is very important from the standpoint of initial orientation of the angle pickoff device since in the present device each disk only has to be oriented relative to its mate and not to the members whose rotation it is measuring. In prior art devices the initial orientation is very difficult since a zero point on the device must be oriented with a null on the members whose rotation is to be measured.

In the present device a first face of each of the pairs of disk faces is rotated continuously at a substantially constant speed by a motor or some other driving means. The second face of each of the pairs of disk faces is connected to each of the members whose relative rotation it is desired to measure. Thus, as the first disk face of each pair rotates past the second disk face of each pair the segments or bits on one face align first with those on the opposite face and then with the spaces between the segments on the opposite face in a periodical manner and may be energized to produce pulses. These pulses may be produced by utilizing the variation of electrical capacitance between the segments or the magnetic interaction of the segments if magnetic segments are utilized. It should be noted that all of the segments on one face align with all of the segments on the mating face to produce one pulse. This simultaneous action of all the segments averages the error contribution of each segment to produce high resultant accuracy. Thus, any bearing runout or imperfection of one segment does not affect the overall operation of the device.

A logic circuit, which will be explained in more detail later, counts the number of full pulses produced by the rotating disks which are in the rotational angle between the two second faces or the two members, and utilizes a high frequency oscillator to determine the phase between the pulses, or the amount of the partial pulse remaining in the rotational angle. An automatic calibration is also utilized, as will be explained later, so that no special requirement for regulating motor speed is required. Thus, a very precise means of measuring the complete pulses and the portion of a complete pulse in the rotational angle between two members is described.

The present device is very simple to construct, since the overall accuracy of the device is not dependent upon the accuracy of each of the segments deposited on the faces of the disks. Also, bearing runout and many other mechanical deviations are effectively eliminated by measuring the axial coincidents of all of the segments on the disk faces at a single time. A further advantage of the present device is the fact that a portion of a full pulse may be measured very accurately by counting the pulses from a high frequency oscillator.

It is the primary object of this invention to provide an improved control apparatus.

It is a further object of this invention to provide means for measuring relative rotational angles between two members.

Figure 2:
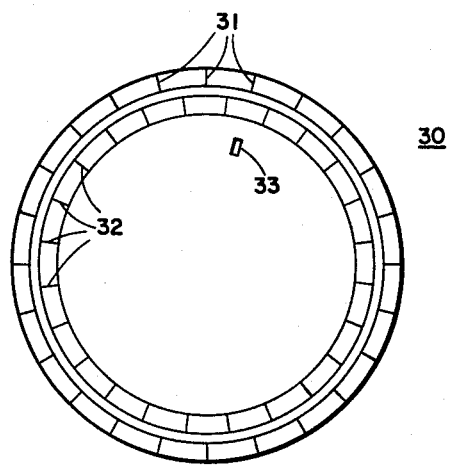
Figure 3:
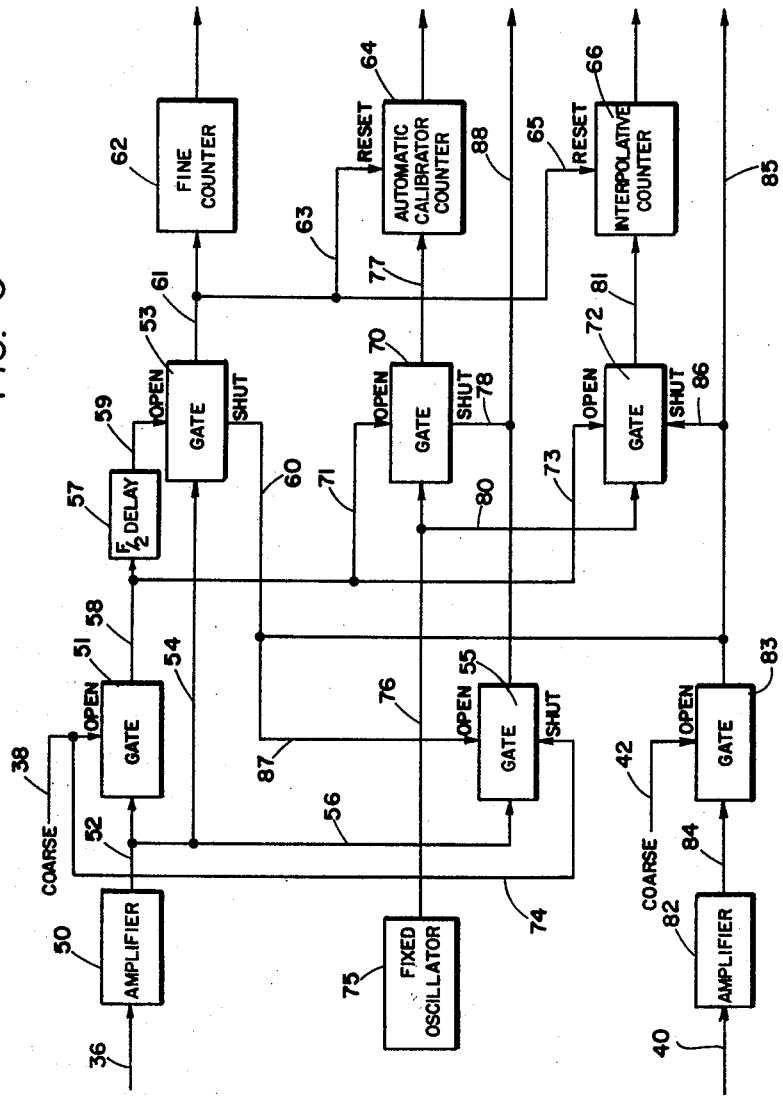
Figure 4:
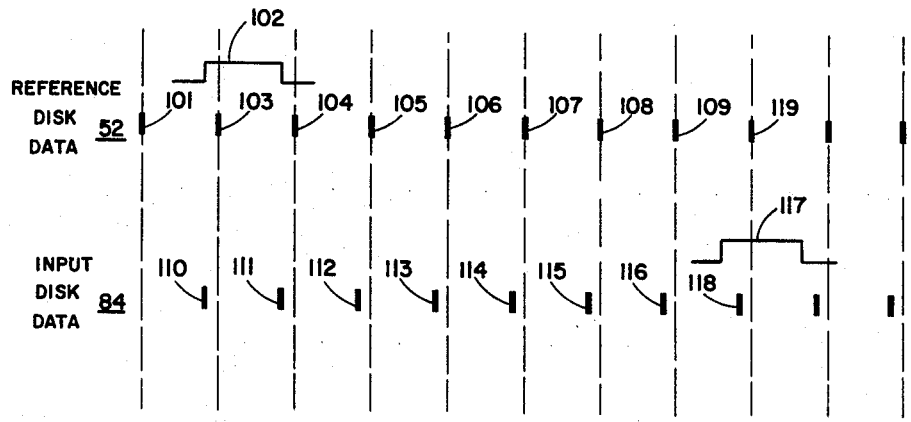
Figure 5:
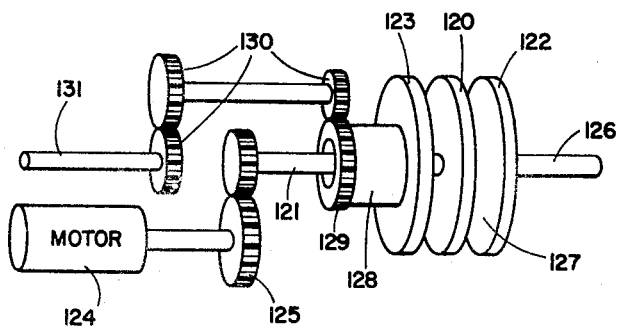
Figure 6:
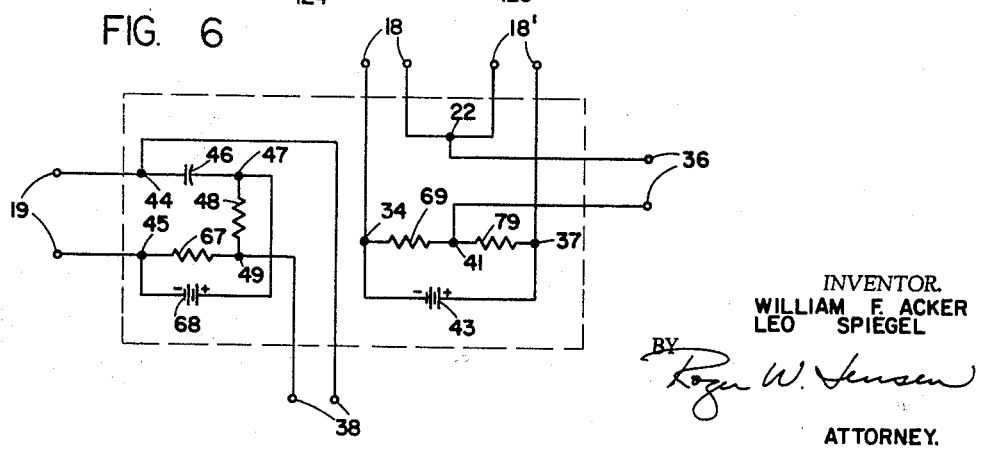

These and other object of this invention will become apparent from the following description of a preferred form thereof and the accompanying specification, claims, and drawings, of which:

FIGURE 1 is a pictorial view of the present invention;
FIGURE 2 is a view of one disk face;
FIGURE 3 is a block diagram of the associated electronics;
FIGURE 4 is a chart showing the time sequence of the pulses in the block diagram in FIGURE 3;
FIGURE 5 is an alternate embodiment of the present invention; and
FIGURE 6 is a schematic diagram of a detector.

In FIGURE 1 a first pair of disks 10 are rotatably mounted for coaxial rotation. The first disk 11 of pair 10 is connected to a motor 12 by a shaft 13. Motor 12 is permanently mounted, by means not shown, and when energized rotates disk 11 at a substantially constant speed. The second disk 14 of pair 10 is mounted in juxtaposition with disk 11 on a shaft 15. Shaft 15 is a portion of the reference shaft or the member which is to be utilized as a reference in relation to which a desired angle may be measured. Only a portion of shaft 15 is shown, as the device to which it is attached or of which it is a member is not pertinent to this invention. First disk 11 of pair 10 has a face 16 which is adjacent to a face 17 on the second disk 14 of pair 10. Adjacent faces 16 and 17 have means disposed on them to produce pulses as they rotate in relation to each other. These means can be seen more clearly in FIGURE 2.

FIGURE 2 shows a preferred embodiment of the pulse producing means disposed on the face of one of the movable disks. A disk face 30 has placed thereon a first set of conducting segments 31. In this preferred embodiment segments 31 are equally spaced, radial segments, positioned along the outer periphery of face 30 and form a complete circle thereon. In FIGURE 2 the segments are shown as being widely spaced for simplicity, whereas, actually there will be a large number of segments 31 to improve the accuracy of the device. The precise number of the fine segments is determined so as to optimise the signal-to-noise ratio in the overall design. The disk of which face 30 is a portion may be composed of nonconducting material and segments 31 may be conducting material deposited on the face 30. If the disk is composed of conducting material segments 31 are raised portions and, in this case, all of the material around the lines is removed to produce the raised segments 31. A second group of segments 32 are placed in a circle which is concentric with the circle formed by segments 31, but displaced radially inward. Segments 32 are equal in number with segments 31 and they are displaced in a clockwise direction so that each segment 32 is approximately halfway between a pair of segments 31. A larger portion or segment 33 of conducting material is placed within the circle formed by segments 32 and constitutes a means for defining a zero point, as will be described later. All of the segments 31, 32, and 33 are composed of conducting material.

In FIGURE 1 disk face 17 on disk 14 is similar to disk face 30 in FIGURE 2. Disk face 16 on disk 11 is similar to disk face 30, except that the segments designated 32 are radially aligned with the segments designated 31. Since the disk faces hereafter discussed are all similar to disk face 30 or the exception, as explained with relation to disk 11, the numbers used in FIGURE 2 to designate the first set of fine segments 31, the second set of fine segments 32, and the coarse segment 33 will be used to designate similar segments on the referred to disk faces. Since motor 12 is causing disk 11 to rotate continuously the first and second set of fine segments 31 and 32 on disk face 16 will be continuously aligning and misaligning with the first and second set of fine segments 31 and 32 on disk face 17 along the axis of rotation. Each time one of the fine segments in first set 31 or second set 32 on disk face 16 aligns axially with one of the fine segments in first set 31 or second set 32, respectively, on disk face 17 all of the fine segments in that set of segments will be axially aligned. Disks 11 and 14 are so mounted that the pulse producing means disposed on faces 16 and 17 coact capacitively to produce pulses or variations as the conducting segments on face 16 are moved past the conducting segments on face 17. Each time the first set of fine segments 31 align a variation in capacitance is produced on a pair of leads 18 electrically connected to disks 11 and 14 by suitable means such as wipers and slip rings, and each time the second set of fine segments 32 align a second variation in capacitance is produced on a pair of leads 18, also electrically connected to disks 11 and 14 by suitable means such as wipers and slip rings. It should be noted that the variations produced by the alignment and misalignment of the first set of fine segments 31 will be 180°, electrically, out of phase with the variations produced by the alignment and misalignment of the second set of fine segments 32. That is, when segments 31 on disk face 16 and segments 31 on disk face 17 align, segments 32 on disk face 16 and segments 32 on disk face 17 will be misaligned. Each time disk 11 makes a complete rotation with respect to disk 14 a variation which is denoted a zero pulse will be produced by the alignment of the coarse segment 33 on disk face 16 and the coarse segment 33 on disk face 17. These coarse pulses are applied to a pair of leads 19. A box 35 labeled detector may contain any device which is capable of utilizing the variations in capacitance due to the alignment and misalignment of the conducting segments 31, 32, and 33 on the disk faces 16 and 17 to produce an electrical signal. For example, as disk 11 rotates with relation to disk 14, disk face 16 and disk face 17 comprise a pair of capacitive plates with the capacitance and, therefore, the electrical impedance between the two faces varying in accordance with the alignment and misalignment of the various conducting segments disposed on the faces. Since the segments 31 act like one varying capacitor and the segments 32 act like another varying capacitor 180° out of phase, the two capacitors may be utilized to energize a push-pull signal processing means such as two legs of an electrical bridge circuit. Referring to FIGURE 6, a schematic of one possible embodiment of detector 35 is shown. It should be noted that detector 39 will be similar to detector 35. Since FIGURES 1 and 3 are block diagrams, some of the leads which are actually two leads, as shown in FIGURE 6, appear as single leads.

In FIGURE 6 leads 18 connect the variable capacitor comprised of segments 31 to a pair of junction points 22 and 34. Also leads 18' connect the variable capacitor comprised of segments 32 to junction point 22 and a junction point 37. A resistor 69, connected between junction point 34 and a junction point 41, forms a third leg of the electrical bridge circuit and a resistor 79, connected between junction point 41 and junction point 37, forms the fourth leg. A power supply 43, connected between junction points 34 and 37 is utilized to energize the bridge circuit and the output on leads 36 is obtained between junction points 22 and 41. It should be noted that any undesirable variation in capacitance between the segments 31 and 32 due to bearing runout or other mechanical variations will be eliminated in the detector 35 because of the push-pull action of the bridge circuit.

A second bridge circuit is utilized to produce electrical pulses from the capacitance change due to the coarse segments 33. The leads 19 are connected to a pair of junction points 44 and 45. A fixed capacitor 46, having approximately the same capacitance as that between leads 19 when segments 33 are not aligned, is connected between a junction point 47 and junction point 44. A resistor 48, connected between a junction point 49 and junction point 47 forms the third leg of the electrical bridge and a resistor 67, connected between junction points 45 and 49 forms the fourth leg. A power supply 68 is connected between junction points 45 and 47 to energize the bridge and the output appears on leads 38 which are connected between junction points 44 and 49.

The signals from detector 35 may be sinusoidal signals or they may be pulses depending upon whether the varying voltages are simply amplified or whether they are utilized to trigger some devices such as flip-flop circuits. The signals from detector 35, in this preferred embodiment, are applied to electronic circuitry, including amplifying circuits, which will be explained in detail later, by connecting means represented by leads 36 and 38. Although simple amplifying circuits are shown, it should be understood that means could be contained therein to produce pulses as the outputs. In the explanation of this circuitry, pulses will be utilized for simplicity.

A second pair of disks 20 has a first disk 21 and a second disk 24 mounted for continuous concentric rotation. First disk 21 is attached to motor 12 by means of a shaft 23. Motor 12 rotates disk 21 in the same direction and at substantially the same speed as disk 11. Second disk 24 of pair 20 is attached to a shaft 25. Shaft 25 is only shown as a portion of a shaft since the device to which it is connected is not a portion of this invention. Shaft 25 is attached to a member which is rotating, or capable of rotating, with relation to the member to which shaft 15 is attached. The present device is utilized to determine the angular rotation of shaft 25 with relation to shaft 15. Disk 21 and disk 24 have disk faces 26 and 27 respectively which are adjacent and interact in the same fashion as already explained for disk faces 16 and 17. Disk face 27 is similar to disk face 30 in FIGURE 2 and disk face 26 is similar to disk face 30 except the lines 32 are radially aligned with the lines 31. The variations in capacitance between disk faces 26 and 27 due to the alignment and misalignment of the fine conducting segments 31 and 32 disposed thereon are applied to leads 28 and 28' respectively. The variations in capacitance between disk faces 26 and 27 due to the coarse lines 33 are applied to leads 29. A detector 39 utilizes the variations in capacitance on the leads 28, 28' and 29 to produce pulses or sinusoidal signals, as already explained in conjunction with detector 35. The signals from detector 39 are applied to an electronic counting circuit, which will be explained later, by connecting means represented by leads 40 and 42 which have thereon a set of fine pulses and coarse pulses respectively.

In FIGURE 3 the fine pulses from detector 35 are applied to an amplifier 50 by connecting means 36. The output from amplifier 50 is applied to a gate 51 by means of a lead 52. It is also applied to a gate 53 by means of a lead 54 and to a gate 55 by means of a lead 56. Gate 51 is opened by a coarse pulse appearing on line 38 connected thereto. This coarse pulse is also utilized to close gate 55 by means of a lead 74. Gate 51 is a coincidence gate or the type of gate which remains open only while the coarse pulse is present on lead 38. The coarse pulse on lead 38 is of a sufficiently long duration to allow at least one full pulse from amplifier 50 to pass through gate 51. This pulse which passes through gate 51 is then applied to a delay circuit 57 by means of a lead 58. The delayed pulse from delay circuit 57 is applied to open gate 53 on lead 59. The delay circuit 57 operates on the first pulse arriving from amplifier 50 to delay it a sufficient amount to open gate 53 after the same pulse appearing on lead 54 has disappeared. Thus, gate 53 is opened by the first pulse which is allowed to pass through gate 51, but gate 53 does not pass this pulse. Gate 53 is the type of gate that remains open, once opened, until a pulse appears on a lead 60 to shut the gate. Thus, after the pulse appearing on lead 59 opens gate 53 a continuous train of pulses from amplifier 50 travel along lead 52, lead 54, through gate 53, and along a lead 61 to a fine counter 62. The pulses from gate 53 are also applied, by means of a lead 63 to reset an automatic calibrator counter 64 and along a lead 65 to reset an interpolative counter 66. The pulse that passes through gate 51 during the time when the coarse pulse is prevalent on lead 38 is applied to open a gate 70 by means of a lead 71 and to open a gate 72 by means of a lead 73. A continuous train of pulses from an oscillator 75 is applied to the gate 70 by means of a lead 76. Oscillator 75 may be any oscillator that produces an electrical signal which has a frequency that is high relative to the pulses produced in detectors 35 and 37. Once gate 70 is opened by the pulse on lead 71 from gate 51 the continuous train of high frequency pulses from oscillator 75 travels through the gate and along a lead 77 to automatic calibrator counter 64. The pulses from the oscillator 75 are also applied to gate 72 on a lead 80. Since gate 72 is opened by the first pulse from gate 51 the oscillator pulses are passed through gate 72 and into interpolative counter 66 by means of a lead 81.

The pulses from detector 39 are applied to an amplifier 82 by means of lead 40. Amplifier 82 is similar to amplifier 50 and produces a set of pulses which are applied to a gate 83 by means of a lead 84. The coarse pulses from detector 39 on lead 42 are applied to gate 83 to open the gate. Gate 83 is a coincidence gate similar to gate 51 and is open only while a coarse pulse is prevalent on lead 42. As long as a coarse pulse is applied to gate 83 the gate is open and a fine pulse from the amplifier 82 will pass through. The fine pulse passing through gate 83 appears on a lead 85 and may be utilized as a "timing pulse" to denote the precise instant at which the relative angle of rotation between the two members was measured. The fine pulse also appears on a lead 86 to close gate 72, on a lead 87 to open gate 55 and on lead 60 to close gate 53. As soon as the pulse from gate 83 is applied to gate 53 and closes that gate, no more fine pulses from amplifier 50 are applied to fine counter 62 so that a final reading from that counter may be taken. Since no more fine pulses pass through gate 53, no more reset pulses are applied to counters 64 and 66. A pulse from amplifier 82 also closes gate 72 so that no more pulses from the oscillator 75 are applied to interpolative counter 66 and the final count in that counter may be read. In order to determine the proper time to read the final count on fine counter 62 and interpolative counter 66 a "read pulse" appears on a lead 88. The "read pulse" on lead 88 is a pulse from amplifier 50 which is allowed to pass through gate 55 once gate 55 is opened by a pulse from amplifier 82. The pulses from amplifier 50 continue to pass through gate 55 and on to lead 88 until a course pulse from detector 35 again appears on lead 38 to open gate 51 and close gate 55. The next pulse from amplifier 50 then resets the automatic calibrator counter 64 and interpolative counter 66 and the entire counting cycle begins again.

In FIGURE 4 a train of pulses designated 52 are representative of the pulses applied to lead 52 by amplifier 50. A second train of pulses numbered 84 represent the pulses applied to lead 84 by amplifier 82. The first pulse 101 on lead 52 applied to gate 51, gate 53, and gate 55 has no effect as all of these gates are closed, except gate 55 which is open and will pass this pulse onto line 88. Assuming that pulse 101 is simply a centrally located pulse in a long train of pulses its presence on lead 88 is extraneous since gate 70 would already have been closed by a previous pulse. At some time after pulse 101, coarse pulse 102 appears on lead 38 to open gate 51 and lead 74 to close gate 55. During the time which coarse pulse 102 holds gate 51 open a second fine pulse 103 appears on lead 52. Since gate 51 is open, pulse 103 will pass through gate 51 and be applied to delay circuit 57. The pulse passing through gate 51 will also open gates 70 and 72. Pulse 103 will also be applied to gate 53 and gate 55, but will have no effect since both of these gates are now closed. One-half cycle later delay 57 will apply pulse 103 to gate 53 to open the gate.

A third pulse 104 from amplifier 50 will be applied to gate 51, gate 53 and gate 55. Since coarse pulse 102 is now no longer holding gate 51 open, pulse 104 will not pass gate 51. Also, pulse 104 will not pass gate 55 since it is at present closed. However, pulse 104 will pass through gate 53 and into fine counter 62. Pulse 104 will also reset automatic calibrator counter 64 and interpolative counter 66. Similarly pulses 105 through 109 will pass through gate 53 and into fine counter 62 and each pulse will also reset counters 64 and 66. During this operation a series of fine pulses 110 through 116 have been applied on lead 84. However, since gate 83 is not open these pulses have no effect. As can be seen from the time sequence chart in FIGURE 4 some time after fine pulses 109 and 116 have occurred a coarse pulse 117 will appear on lead 42. It should be understood that the time at which coarse pulse 117 appears is a direct indication of the angle of rotation between shafts 15 and 25. When coarse pulse 117 is applied to gate 83, gate 83 is open for the duration of the coarse pulse 117. Thus, fine pulse 118, which occurs during the time which coarse pulse 117 is applied to gate 83, will pass through gate 83 and be applied to close gate 53, open gate 55, and close gate 72. By closing gate 53, the fine pulses from amplifier 50 are prevented from passing through to fine counter 62. Therefore, pulse 109 is the last pulse to enter fine counter 62 during this cycle of operation. Pulse 109 is also the last pulse to reset counters 64 and 66. By closing gate 72 the further oscillator pulses are prevented from entering interpolative counter 66 and it is ready to be read. Pulse 119 from amplifier 50 is now applied to gate 55 which has been opened by pulse 118 from amplifier 82 and, thus, pulse 119 appears on lead 88 as a "read signal." This "read signal" signifies that fine counter 62 and interpolative counter 66 are ready to be read. Pulse 119 is also applied to gate 70 on a lead 78 to close the gate and stop further pulses originating in oscillator 75 from entering automatic calibrator counter 64. Thus, automatic calibrator counter 64 is also ready to be read.

It should be noted that pulse 118 closed gate 72 and opened gate 55 so that pulse 119 could pass through gate 55 and close gate 70. Thus, the automatic calibrator counter 64 accepted oscillator 75 pulses from the time it was reset by pulse 109 until gate 70 was closed by pulse 119, and the interpolative counter 66 accepted oscillator 75 pulses from the time it was reset by pulse 109 until gate 72 was closed by pulse 118. The ratio of the number of pulses in counter 66 to the number of pulses in counter 64 is an accurate indication of the amount of time, or the phase, between the fine pulses 109 and 119 and between the fine pulses 109 and 118. Since the conducting segments 21, 32, and 33 are permanently positioned on the pairs of disks 10 and 20 the train of pulses 52 will always have the same sequence in relation to pulse 102 and the train of pulses 84 will always have the same sequence in relation to pulse 117. Thus, the number of full and fractional fine pulses appearing on lead 52, starting at pulse 103 and continuing until pulse 118 occurs is a direct indication of the angle between shafts 15 and 25. This can be accurately determined by counting the number of full pulses between pulse 103 and 118 and determining what portion of a full cycle or pulse, from the ratio of the number of oscillator 75 pulses in counter 66 to the number of oscillator 75 pulses in counter 64, to add to the number of full pulses. As can be seen from FIGURE 4, the number of pulses in counter 66 is an accurate indication of the time between pulse 109 and pulse 118 and the number of pulses in counter 64 is an accurate indication of the angle of rotation between pulse 109 and pulse 119, or the amount of rotation in a full pulse. The ratio of the two groups of pulses is an accurate indication of the amount of a portion of a pulse to add to the full pulses in counter 62 to determine the angle of rotation between shafts 25 and 15 precisely. It should be noted that counter 64 provides an automatic calibration for the interpolative counter so that small variations in the speed of motor 12 have relatively little effect. For example, a reduction in speed of motor 12 would delay the axial alignment of the segments on the disk faces and, thereby, allow more time between fine pulses. If there is more time between fine pulses, more pulses from oscillator 75 will be allowed to enter counter 66. However, more pulses from oscillator 75 will also enter counter 64 and the ratio will remain the same. This same reasoning can be applied to note that variations in oscillator 75 have small effect also. It can be seen that by utilizing the number of fine pulses in fine counter 62 and the accurate indication of the phase between the fine pulses a very accurate indication of the angle between shaft 15 and shaft 25 is obtained.

Also, each complete rotation of the first disks 11 and 21 of the pairs 10 and 20, respectively, produce a complete indication of the angle between shaft 15 and shaft 25, so that a complete and accurate reading of the angle can be made for each revolution of the motor 12.

A second possible embodiment of the present invention is shown in FIGURE 5. The first disk 120 is attached to a shaft 121, which is rotatably mounted by means not shown. Disk 120 has pulse producing means such as shown in FIGURE 2 on both faces. Disk 120 is continuously rotated by means of a motor 124 and a gear train 125. A second disk 122 is mounted for rotation coaxial with disk 120 and attached to a shaft 126. Shaft 126 is connected to a first member, now shown, in relation to which an angle of rotation is to be measured. Disk 122 is mounted so that face 127 having pulse producing means similar to those shown in FIGURE 2 mounted thereon is adjacent to one of the faces of disk 120. Thus, the combination of face 127 of disk 122 and the open face of disk 120 would produce a varying capacitance which could be applied to a detector such as 35 to produce the desired pulses. A second disk 123, attached to a hollow cylinder 128 having a gear 129 at the opposite end, is mounted, by means not shown, concentric with shaft 121 so that the face of disk 123 which is opposite to cylinder 128 is adjacent to disk 120. The face of disk 123 adjacent to disk 120 has disposed thereon pulse producing means such as shown in FIGURE 2. Gear 129 is driven by a chain of gears 130 which are attached to a shaft 131. Shaft 131 is attached to the second member the rotation of which it is desired to measure with respect to shaft 126. Thus, the relative rotation of disks 120 and 123 produce a varying capacitance which may be applied to a detector such as detector 39 to produce output pulses indicative of that rotation.

It should be noted that in both of the described embodiments conducting segments disposed about the entire periphery of a pair of rotating disks are utilized to produce one pulse each time they align and misalign. Thus, the accuracy with which each segment is placed on each disk will have little effect in the overall operation of the device. Also, slight axial or radial runout of the bearings mounting the respective disks for rotation will have very little effect on the overall operation of the device. Because two sets of fine lines are used on each disk and the signals therefrom are applied to inputs of push-pull electrical bridges much interference and noise which would otherwise be prevalent can therefore be nulled out. It should also be noted that no initial orientation or positioning problems are prevalent in this device since the relative rotation is measured rather than the rotation from an initial zero point. Thus, a highly accurate device for measuring the relative rotation between two members has been described.

While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

We claim:

1. A digital angle pickoff of the class described comprising:
    (a) a first and second pair of disks;
    (b) means rotatably mounting the first and second disk of each of said pairs in juxtaposition and with substantially aligned axes;
    (c) means for continuously rotating the first disk of each pair at a substantially constant speed;
    (d) cooperating means disposed on the adjacent faces of each pair of disks for producing electrical pulses and for defining a zero point upon relative rotation between said disks in each of said pairs;
    (e) means for determining the relative rotation between the second disks of said pairs of disks; and
    (f) means connecting said cooperating means to said last named means.

2. A digital angle pickoff of the class described comprising:
    (a) a first and second pair of surfaces, each pair of surfaces having disposed thereon means for producing electrical signals and for defining a zero point upon relative rotation therebetween;
(b) means rotatably mounting said pairs of surfaces in juxtaposition and with substantially aligned axes;
(c) means for continuously rotating the first surfaces of each of said pairs of surfaces at a substantially constant speed;
(d) means for determining the relative rotation between the second surfaces of said pairs of surfaces; and
(e) means connecting said means for producing signals to said last named means.

3. A digital angle pickoff of the class described comprising:
(a) a first and second pair of disk faces, each face having thereon a set of electrically connected conducting segments equally spaced about a circle concentrically located on said face and means for indicating a zero point;
(b) means rotatably mounting said pairs of faces in juxtaposition and with substantially aligned axes;
(c) means for continuously rotating one face of each of said pairs of faces at a substantially constant speed; and
(d) means for determining the relative rotation between said pairs of faces by the alternate axial aligning and misaligning of said conducting segments on said pairs of faces.

4. A digital angle pickoff of the class described comprising:
(a) a first and second parallel pair of disk faces, said first pair of faces comprising a first and a second face rotatably mounted in juxtaposition and said second pair of faces comprising a first and a second face rotatably mounted in juxtaposition, each face having thereon a set of electrically connected conducting segments equally spaced about a circle concentrically located on said face and means for indicating a zero point;
(b) a first and a second member mounted for relative rotation therebetween;
(c) means mounting said second face of said first pair of disk faces on said first member and said second face of said second pair of disk faces on said second member;
(d) means for continuously rotating said first faces of each of said pairs of faces at a substantially constant speed;
(e) means comprising logic circuitry and a high frequency oscillator; and
(f) means connecting said conducting segments, said means for indicating a zero point, and said high frequency oscillator to said logic circuitry, so as to provide electrical signals indicative of the angle of rotation between said first and second members.

5. A digital angle pickoff of the class described comprising:
(a) a first and second parallel pair of disk faces, said first pair of faces comprising a first and a second face rotatably mounted in juxtaposition and said second pair of faces comprising a first and a second face rotatably mounted in juxtaposition, each said face having thereon a first set of electrically connected conducting segments equally spaced about a circle concentrically located on said face, a second set of electrically connected conducting segments alternately interposed between said first set of segments, and means for indicating a zero point;
(b) a first and a second member mounted for relative rotation therebetween;
(c) means mounting said second face of said first pair of disk faces on said first member and said second face of said second pair of disk faces on said second member;

(d) means for continuously rotating said first faces of each of said pairs of faces at a substantially constant speed;
(e) push-pull signal processing means;
(f) means connecting said first and second set of conducting segments to said push-pull means;
(g) means comprising a plurality of gate circuits, a plurality of counting circuits, and a high frequency oscillator; and
(h) means connecting said push-pull means, said means for indicating a zero point, and said high frequency oscillator to said gate circuits and said gate circuits to said counting circuits, said counting circuits providing outputs indicative of the rotational angle between said first and second members.

6. A digital angle pickoff of the class described comprising:
(a) a first and second parallel pair of disk surfaces, said first pair of surfaces comprising a first and a second surface rotatably mounted in juxtaposition and said second pair of surfaces comprising a first and a second surface rotatably mounted in juxtaposition;
(b) cooperating means disposed on said disk surfaces for producing electrical pulses and for defining a zero point upon relative rotation between said surfaces in each of said pairs;
(c) a first and a second member mounted for relative rotation therebetween;
(d) means mounting said second surface of said first pair of disk surfaces on said first member and said second surface of said second pair of disk surfaces on said second member;
(e) means for continuously rotating said first surface of each of said pairs at a substantially constant speed;
(f) means comprising a plurality of gate circuits, a plurality of counting circuits, and a high frequency oscillator; and
(g) means connecting said cooperating means and said high frequency oscillator to said gate circuits and said gate circuits to said counting circuits, said counting circuits providing outputs indicative of the rotational angle between said first and second members by counting pulses from said cooperating means and being capable of interpolating between two of said pulses by counting pulses from said high frequency oscillator.

7. A digital angle pickoff of the class described comprising:
(a) a first and second parallel pair of disk faces, said first pair of faces comprising a first and a second face rotatably mounted in juxtaposition and said second pair of faces comprising a first and a second face rotatably mounted in juxtaposition;
(b) cooperating means disposed on said disk faces for producing substantially symmetrical pulses and for defining a zero point upon relative rotation between said faces in each of said pairs;
(c) a first and a second member mounted for relative rotation therebetween;
(d) means mounting said second face of said first pair of disk faces on said first member and said second face of said second pair of disk faces on said second member;
(e) means for continuously rotating said first face of each of said pairs at a substantially constant speed;
(f) first pulse counting means;
(g) second pulse counting means including automatic calibration means, said automatic calibration means effectively compensating for variations in the speed of said means for rotating said first faces; and
(h) means connecting said cooperating means to said first and second pulse counting means, said first pulse counting means indicating the number of full pulses produced by said cooperating means between said zero point on said second face of each of said pairs and said second pulse counting means being capable of interpolating between two of said pulses.

8. A digital angle pickoff of the class described comprising:
   (a) a first and second parallel pair of disk faces, said first pair of faces comprising a first and a second face rotatably mounted in juxtaposition and said second pair of faces comprising a first and a second face rotatably mounted in juxtaposition;
   (b) cooperating means disposed on said disk faces for producing substantially symmetrical pulses upon relative rotation between said faces in each of said pairs;
   (c) a first and a second member mounted for relative rotation therebetween;
   (d) means mounting said second face of said first pair of disk faces on said first member and said second face of said second pair of disk faces on said second member;
   (e) means for continuosuly rotating said first face of each of said pairs at a substantially constant speed;
   (f) first pulse counting means;
   (g) second pulse counting means including automatic calibration means, said automatic calibration means effectively compensating for variations in the speed of said means for rotating said first faces; and
   (h) means connecting said cooperating means to said first and second pulse counting means, said first pulse counting means accepting the number of full pulses produced by said cooperating means indicative of the angle of rotation between said first and second members, and said second pulse counting means being capable of interpolating between two of said pulses thereby in conjunction with said first pulse counting means accurately indicating the relative angle of rotation between said first and second members.

9. A digital angle pickoff of the class described comprising:
   (a) a first and second pair of disks;
   (b) means rotatably mounting the first and second disk of each of said pairs in juxtaposition and with substantially aligned axes;
   (c) means for continuously rotating the first disk of each pair at a substantially constant speed;
   (d) cooperating means disposed on the adjacent faces of each pair of disks for producing substantially symmetrical pulses and for defining a zero point upon relative rotation between said disks in each of said pairs;
   (e) computing means providing outputs indicative of the relative rotation between the second disks of said pairs of disks;
   (f) automatic calibration means effectively compensating for variations in the speed of said means for continuously rotating the first disk of each pair; and
   (g) means connecting said cooperating means and said automatic calibration means to said computing means.

10. A digital angle pickoff of the class described comprising:
    (a) a first and second pair of surfaces, each pair of surfaces having disposed thereon means for producing substantially symmetrical electrical signals and for defining a zero point upon relative rotation therebetween;
    (b) means rotatably mounting said pairs of surfaces in juxtaposition and with substantially aligned axes;
    (c) means for continuously rotating the first surfaces of each of said pairs of surfaces at a substantially constant speed;
    (d) computing means providing outputs indicative of the relative rotation between the second surfaces of said pairs of surfaces;
    (e) automatic calibration means effectively compensating for variations in the speed of said means for continuously rotating the first surfaces of each of said pairs; and
    (f) means connecting said means for producing signals and said automatic calibration means to said computing means.

11. A digital angle pickoff of the class described comprising:
    (a) a first and second pair of disks;
    (b) means rotatably mounting the first and second disk of each of said pairs in juxtaposition and with substantially aligned axes;
    (c) means for continuously rotating the first disk of each pair at a substantially constant speed;
    (d) cooperating means disposed on the adjacent faces of each pair of disks for producing substantially symmetrical pulses and for defining a zero point upon relative rotation between said faces in each of said pairs;
    (e) interpolating means capable of interpolating between two of said pulses:
    (f) means producing outputs indicative of the relative rotation between the second disks of said pairs of disks; and
    (g) means connecting said cooperating means and said interpolating means to said last named means.

12. A digital angle pickoff of the class described comprising:
    (a) a first and a second member mounted for relative rotation therebetween;
    (b) a first and a second pair of disk faces, each face having thereon a set of electrically connected conducting segments;
    (c) means mounting one face of said first pair of disk faces on said first member and one face of said second pair of disk faces on said second member;
    (d) means for continuously rotating the second faces of said first and second pairs of disk faces; and
    (e) means for providing signals indicative of the relative rotation between said first and second members from the alternate axial aligning and misaligning of said conducting segments on said pairs of faces.

13. A digital angle pickoff of the class described comprising:
    (a) a first and second pair of disk faces, each pair of faces having disposed thereon means for producing electrical signals;
    (b) means rotatably mounting the faces of said pairs of disk faces in juxtaposition and with substantially aligned axes;
    (c) means for continuously rotating one face of each of said pairs of disk faces at a substantially constant speed;
    (d) interpolating means, capable of interpolating between two of said electrical signals, including a high frequency oscillator and automatic calibration means, said automatic calibration means effectively compensating for variations in the speed of said means for continuously rotating one face of each of said pairs;
    (e) means for providing signals indicative of the relative rotation between the pairs of disk faces; and
    (f) means connecting said means for producing electrical signals and said interpolating means to said last named means.

14. A digital angle pickoff of the class described comprising:
    (a) a first and a second member mounted for relative rotation therebetween;
    (b) a first and a second pair of disk faces, each face having thereon a set of electrically connected conducting segments;
    (c) means mounting one face of said first pair of disk faces on said first member and one face of said second pair of disk faces on said second member;

(d) means for continuously rotating the second faces of said first and second pairs of disk faces;
(e) automatic calibration means effectively compensating for variations in the speed of said means for continuously rotating the second faces; and
(f) means for providing signals indicative of the relative rotation between said first and second members from the alternate axial aligning and misaligning of said conducting segments on said pairs of faces.

No references cited.

MALCOLM A. MORRISON, *Primary Examiner.*